(12) United States Patent
Bignon et al.

(10) Patent No.: US 6,244,308 B1
(45) Date of Patent: Jun. 12, 2001

(54) DRIPLESS FREESTANDING BASTER

(75) Inventors: Lucas Bignon, Suresnes; Mathieu Lion, Malakoff, both of (FR)

(73) Assignee: Duotrade Trading, Lda., Funchal-Madere-Portugal ( * ) Notice: Subject to any disclaimer, the term of this patent is extended or adjusted under 35 U.S.C. 154(b) by 0 days.

(21) Appl. No.: 09/451,737

(22) Filed: Nov. 30, 1999

(51) Int. Cl.[7] .............................. B65B 1/04; B65B 3/04; B65B 31/00; B67C 3/00
(52) U.S. Cl. .................. 141/26; 141/18; 141/25; 141/21; 99/345
(58) Field of Search ....................... 141/18, 21, 25, 141/26; 99/345; 222/191

(56) References Cited

U.S. PATENT DOCUMENTS

| | | | |
|---|---|---|---|
| 1,263,453 | * | 4/1918 | Medley .................................. 141/26 |
| 3,295,523 | * | 1/1967 | Weichselbaum ..................... 128/232 |
| 3,530,785 | * | 9/1970 | Peters et al. ............................ 99/256 |
| 5,934,187 | * | 8/1999 | Leon ...................................... 99/516 |

* cited by examiner

Primary Examiner—Timothy L. Maust
(74) Attorney, Agent, or Firm—Kenyon & Kenyon

(57) ABSTRACT

An improved bulb baster wherein one end of the bulb is flat, allowing the baster to be stood upright. In one embodiment of the present invention the bulb of the baster is formed from a thermo resistant material that permits flexibility while helping to prevent burns to finger tips when adding or subtracting liquids to and from a food item, respectively. In another embodiment of the present invention the tube of the baster can be fitted with an adjustable collar to provide additional functionality.

35 Claims, 3 Drawing Sheets

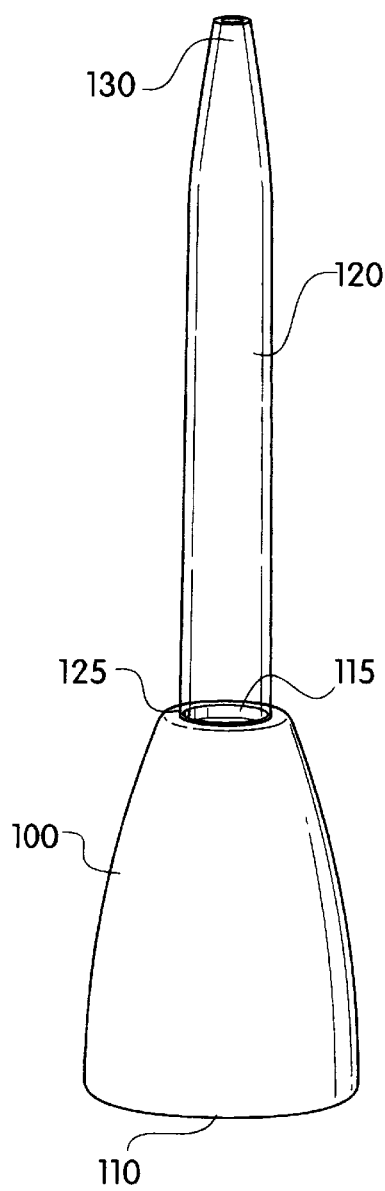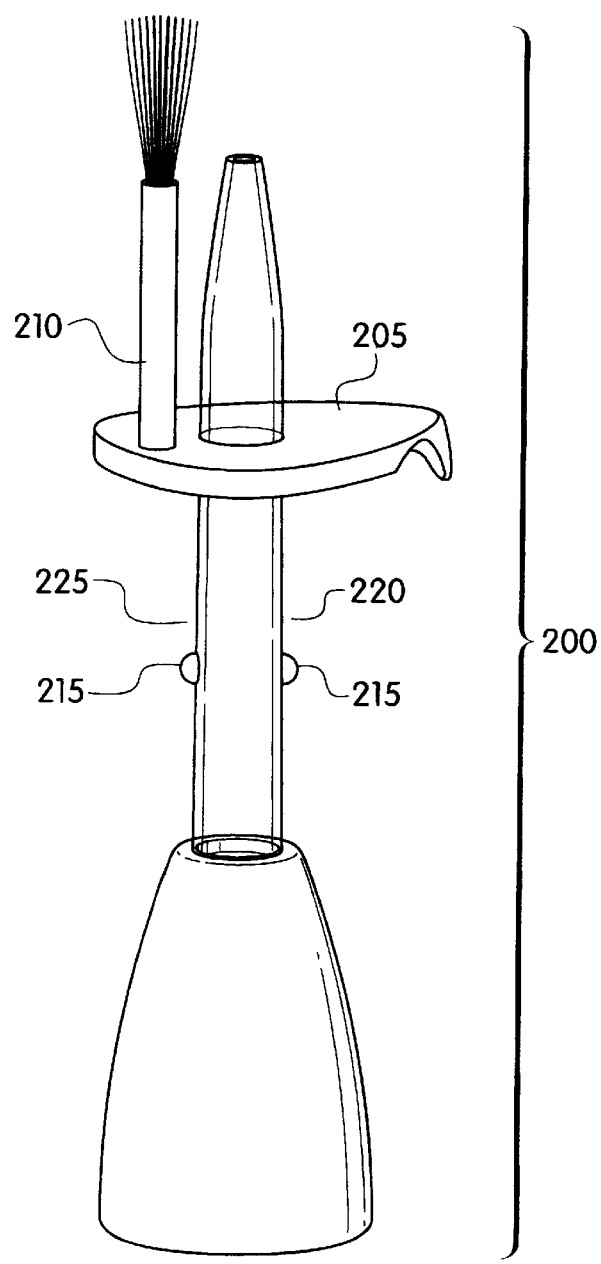
FIG. 1
FIG. 2

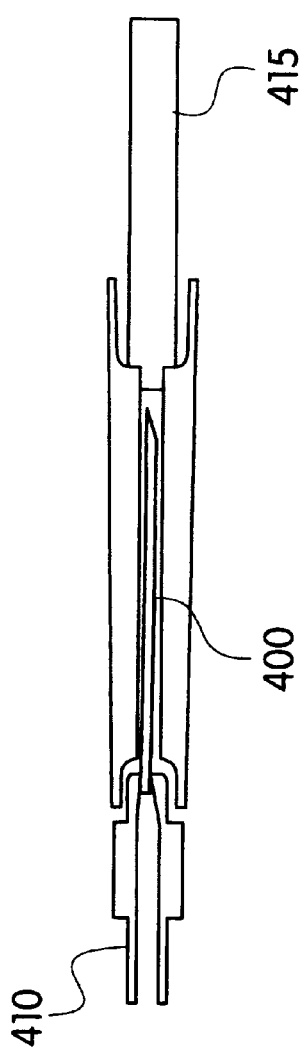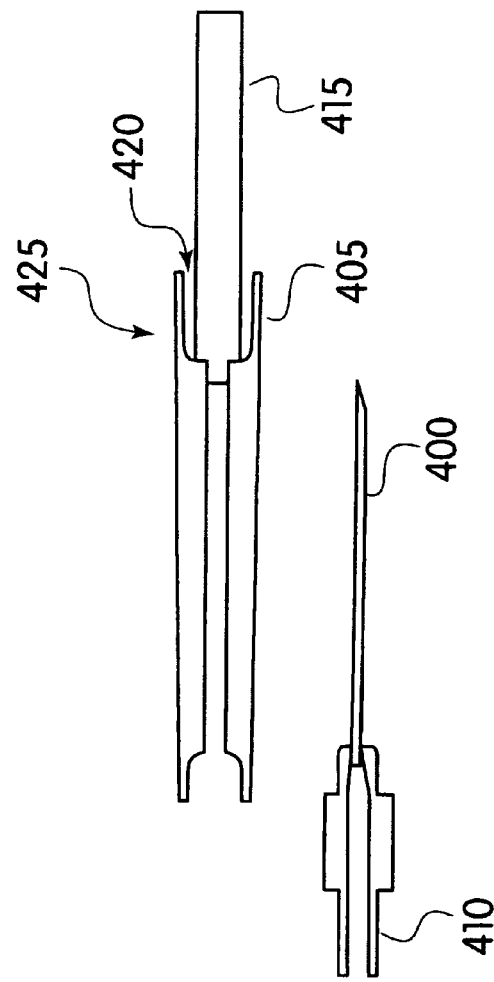
FIG. 4A
FIG. 4B

DRIPLESS FREESTANDING BASTER

BACKGROUND ART

The present invention pertains to bulb basters. More particularly, the present invention pertains to a flattop, dripless bulb baster, wherein the bulb is composed of a thermo resistant material, such as, but in no way by limitation, a thermoplastic rubber or silicon, or the like.

The classic bulb baster design consists of a bulbous pump composed of some type of flexible, deformable material affixed to a syringe shaped tube. This design has a rounded bulbous pump. The rounded, bulbous pump design of the classic baster limits it to a horizontal position when placed on a surface if left unaided.

The classic bulb baster design presents at least two problems:

1) After using the baster for adding and subtracting liquids to a dish (where dish will refer to through the patent as any culinary dish or any food item, such as, but not by way of limitation, meats such as poultry, fish, pork, and beef as well as cakes and breads), the classic baster, as mentioned above, has to be laid down in a horizontal position on a kitchen counter top other such support surface. The horizontal positioning of the baster may result in the leaking out dripping of any residual liquids in the baster onto a kitchen counter top or other such support surface. Such leakage may result in stains, or in the case where the liquid is hot, even burns to the surface the baster is laid on. Notwithstanding the above, the classic baster design still requires clean-up of the surface the baster is placed on, such clean-up results in additional cooking transaction costs or steps. Further, the classic baster design, when laid horizontally, is prone to roll about on the surface, such unchecked movement may result in the baster rolling off of the surface where it is placed onto the floor or other such unintended area. If the baster rolls onto the floor this results in additional cleaning costs or transaction costs and runs the risk of having to throw out any liquid residue that may be required in subsequent cooking steps. In the worst case rolling scenario, the baster, once placed on a surface and left unattended, might roll onto an active stove top quite possibly resulting in a kitchen fire or minimally resulting in damage or destruction of the baster itself.

2) In the classic baster bulb design the bulbs themselves are normally not made of a material that would protect the user of a baster from burning his or her hands when using a baster to remove or add hot liquids from and to a dish, respectively.

Any variations on the classic bulb baster design have come in two forms. First, to permit variation and to stay in accord with seasonal or decorative cheer, some manufacturers have created decorative bulbs, such as U.S. Design Pat. Nos. 0390425 and 0390070. The leaking and burning problems of the classic bulb baster design persist with the decorative bulbs. If the decorative bulbs address any of the above stated problems with the classic baster design they did so only latently. Some of the decorative bulb designs, due to their elaborate corrugations or molds, tend to minimize baster rolling. Second, some manufacturers employ the use of thicker walled bulbs, although without the benefit of thermo resistive materials, to prevent or minimize burns when removing or adding hot liquids from and to a dish, respectively. However, the leaking, staining, rolling and burning risks still persist in such designs.

In view of the foregoing problems with leakage, staining, rolling and risk of burns, there is a need for a flattop bulb baster wherein the pump consists of a thermo resistant material.

SUMMARY OF THE INVENTION

The invention is directed to an improved bulb baster wherein one end of the bulb is flat, allowing the baster to be stood upright. In one embodiment of the present invention the bulb of the baster is formed from a thermo resistant material that permits flexibility while helping to prevent burns to finger tips when adding or subtracting liquids to and from a dish, respectively. In another embodiment of the present invention the tube of the baster can be fitted with an adjustable collar to provide additional functionality.

BRIEF DESCRIPTION OF THE DRAWINGS

FIG. 1 is a perspective view of the baster standing upright according to an embodiment of the present invention.

FIG. 2 is a perspective view of the baster standing upright in the sliding collar and brush configuration according to an embodiment of the present invention.

FIG. 4A is a cross sectional view of the brush and hollow needle assembly according to an embodiment of the present invention.

FIG. 4B is a cross sectional view of the brush and hollow needle assembly where the brush sheath has been removed leaving only the hollow needle assembly according to an embodiment of the present invention.

DETAILED DESCRIPTION

Figure 3A:
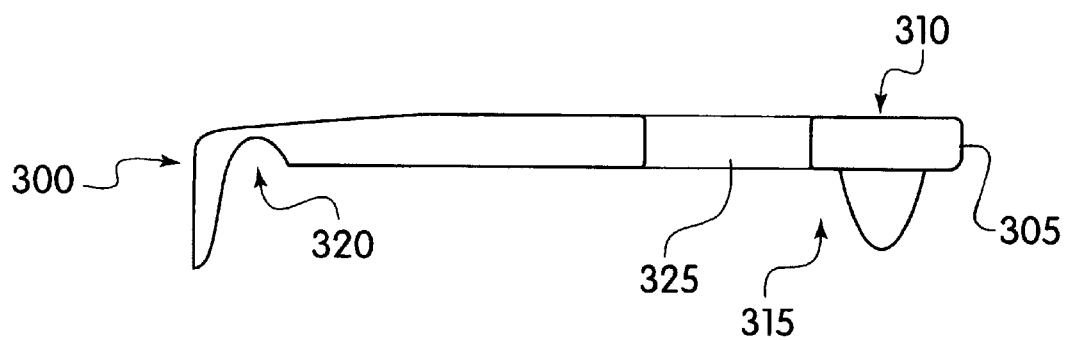
FIG. 3A is a cross sectional view of the sliding collar according to an embodiment of the present invention.
Figure 3B:
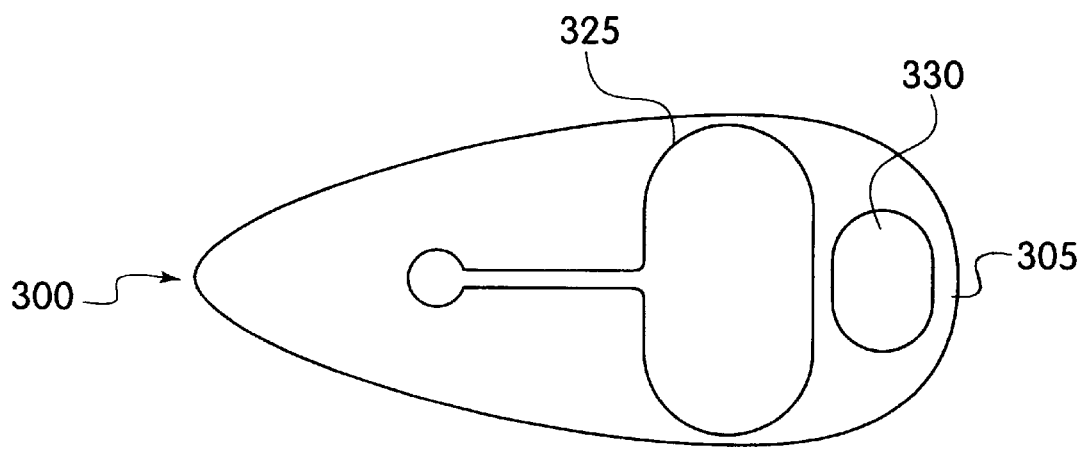
FIG. 3B is a top surface view of the sliding collar according to an embodiment of the present invention.

Recent advances in polymer materials and in the techniques for their fabrication have permitted the application of otherwise laboratory-restricted materials to common household devices. These new materials and fabrication techniques are presenting opportunities for the creation of common everyday household devices that had heretofore been prohibitively expensive or too complicated to create or even envision, due to high costs or the lack of the necessary raw materials. FIG. 1 shows a perspective view of one such device, the free standing, dripless baster. According to one embodiment of the present invention the baster bulb 100 is composed of a deformable material that permits the bulb to act as a pump for the baster. According to one embodiment of the present invention the bulb is formed such that its first end 110 is flat allowing the baster to be stood upright when not in use. The ability of the baster to be placed upright eliminates the problems of leaking or dripping, staining, and rolling associated with the classic baster design. According to one embodiment of the present invention the bulb may have flat sides in conjunction with a flat bottom to prevent rolling when the baster is placed in a horizontal position on a flat surface. Further, according to an embodiment of the present invention, the bulb is composed of a material that is thermo resistant to protect the user from burns when subtracting or adding hot liquids from and to a dish, respectively. According to this embodiment the bulb material can be composed of, but not by way of limitation, any thermoplastic, elastomer; such as Santoprene®, Santoprene® 8000, Vyram®, Geolast®, Trefsin®, Wistaflex®, or Dytron® XL, heat resistant material, natural rubber, plastic polymer, silicon containing material, and any soft deformable material. In one embodiment of the present invention, the bulb has a second end 115 that is affixed to a tube 120. According to one embodiment of the present invention, the tube can be cylindrically shaped having a first end 125 and a second end 130, with said first end 125 affixed to said second end of bulb 115 and said second end of tube 130 tapered. In one embodiment of the present invention, the second end of the tube 130 remains open to the environment to permit the subtraction and addition of liquids from and to a dish, respectively. Additionally, according to one embodiment of the present invention said second end of the tube 130 remains open so it can be fitted with various extensions, such as a nylon brush or plastic or stainless steel hollow needle, so as to permit a range of application techniques (see generally FIGS. 4A and 4B). Further, according to one embodiment of the present invention the can be fitted with a cleaning brush for cleaning the baster. In this embodiment, the collar can be fitted with both the cooking brush and the cleaning brush. Further, in this embodiment the brushes can be on the same side of the collar, but opposite surface; or opposite sides of the collar, but same surface; or opposite sides of the collar, but opposite surface.

The tube of the baster can be composed of, but in no way by limitation, acrylic, stainless steel, plastic polymers, beat resistant plastic, polyvinyl chloride, or any other rigid material. The tube may be opaque or transparent, contain marks or other indicia, or be in possession of any type of surface features such as bumps, ridges or corrugations.

FIG. 2 shows a perspective view of the baster 200 fitted with the sliding collar 205 in which a brush 210 has been affixed to the sliding collar according to one embodiment of the present invention. According to an embodiment of the present invention the baster tube may possess bumps or ridges 215 along the surface 220 of the tube between the first open end 125 and the second open end 130 to limit the possible positions the sliding collar can take on the tube. In FIG. 3A a cross sectional view of the sliding collar is shown according to one embodiment of the present invention. The sliding collar has a first end 300 and a second end 305 and a top surface 310 and a bottom surface 315. According to an embodiment of the present invention the first end 300 of the sliding collar can be molded into the shape of a hook 320. In this embodiment, the hook could be used to allow easy storage of the baster when not in use. Additionally, the first end of the sliding collar 300 could be fitted, but not by way of limitation, with a hook attachment through some connecting means. The second end 305 can be manufactured to permit the connection 330 of various accessories to the sliding collar, thereby allowing a greater range of functionality for the baster. Alternatively, the first end of the sliding collar 300 can be manufactured to permit both the connection 330 receptacle for various accessories and the molded or fitted hook. Further, according to one embodiment of the present invention the both the top and bottom surface of the collar possess connecting means. For example, but not by way of limitation, the first end of the collar may house a connection for a basting brush on the top surface and a connection for a baster cleaning brush on the bottom surface or vice versa. According to one embodiment of the present invention the sliding collar possesses an opening 325 between the first end 300 and the second end 305. In one embodiment of the present invention, the opening 325 can be manufactured to allow easy maneuverability of the collar along the length of the tube generated by application of moderate force, while at the same time allowing the sliding collar to maintain a static position along the tube until the necessary force is applied to move it along the length of the tube or remove it from the tube altogether. According to another embodiment of the present invention the sliding collar can be manufactured such that the opening 325 permits only quantum or non continuous positioning along the length of the tube. According to this embodiment of the present invention the opening of the sliding collar would possess a dimension that would allow it to naturally result in a position with the brush being coexistent with the tapered tip of the baster (See FIG. 2). This embodiment would allow liquids to be dispensed from the baster directly onto the brush tip. Alternatively, according to one embodiment of the present invention the baster tube can contain a series of preset marks that allow the user to access certain various baster and collar funtionality. For instance, one such preset mark would allow the user to place the collar in such a position so that the bristles of the brush extend beyond the second end of the tube 130 such that any liquid extruded from the baster would be extruded onto the bristles of the brush.

According to one embodiment of the present invention, the brush structure affixed to the sliding collar in FIG. 2 can be removed from the collar and affixed to said second end of tube 130 to permit alternative application techniques. Further, according to an embodiment of the present invention the brush structure can house both a brush and a hollow needle. In FIG. 4A a cross sectional view of a hollow needle 400 and brush 405 pairing is shown according to one embodiment of the present invention. In the hollow needle 400 and brush 405 pairing the brush functions as a sheath or housing for the hollow needle 400, wherein the base of the hollow needle 410 permits the attachment of the brush to the second end of the sliding collar 305 or the second end of the tube 130. FIG. 4B shows a cross sectional view of the hollow needle assembly, with the brush sheath having been removed to expose the hollow needle according to one embodiment of the present invention. The hollow needle assembly 400 can be affixed alone to the second end of the tube 130 to allow liquids to be injected under the skin or deeper into the internal cavity of such dishes such as, but not by way of limitation, fowl, beef, fish, pork, or any food item. Further, according to one embodiment of the present invention the bristles 415 of the brush sheath of FIG. 4B are recessed in a concave or hollow structure 420 such that the polymer body of the brush forms a lip or rim 425 around the bristles that possesses a greater circumference than that of the bristles themselves. This lip or rim 425 functions as a small cup or reservoir to catch and hold any residual liquid that may remain in the brush after application, thereby preventing any liquid from dripping down onto the brush body, and ultimately onto whatever the baster may be placed on, when the baster is placed or hung in the upright position. dripping down onto the brush body, and ultimately onto whatever the baster may be placed on, when the baster is placed or hung in the upright position.

Although several embodiments are specifically illustrated and described herein, it will be appreciated that modifications and variations of the present invention are covered by the above teachings and within the purview of the appended claims without departing from the spirt and intended scope of the invention. For example, the flat bottom bulb can be configured such that part of the bottom and part of one side of the bulb are flat such that instead of standing upright at a 90 degree angle with the plane of the resting surface, the baster stands upright at a some other arbitrary angle such as a 70 degree angle with the plane of the resting surface. Further, the bulb bottom need not be flat at all, but instead affixed with legs so as to balance the baster in an upright position.

What is claimed:

1. A baster comprising:

a pump having a first end and a second open end, wherein the first end is flat;

a tube having a first open end and a second open end with the first open end affixed to the pump, the tube having a top surface and a bottom surface;

a collar capable of being fitted on the tube, the collar having a first end and second end with an opening between the two ends sufficient for the collar to slide on the top surface and bottom surface of the tube between the first end and second end of tube, the first end of the collar being shaped as a hook and the second end possessing a means for attaching additional structures or accessories.

2. A baster comprising:

a pump having a first end and a second open end, wherein the first end is flat;

a tube having a first open end and a second open end with the first open end affixed to the pump, the tube having a top surface and a bottom surface;

a collar capable of being fitted on the tube, the collar having a first end and second end with an opening between the two ends sufficient for the collar to slide on the top surface and bottom surface of the tube between the first end and second end of tube; and a plastic and nylon brush fitted to the second end of the collar.

3. The baster of claim 2 wherein the plastic and nylon brush is a housing or sheath for a hollow needle assembly that resides within the brush.

4. The brush of claim 2 wherein bristles of the brush reside in a concave structure on the brush such that the plastic lip of the brush structure resides above that of the attachment point for the bristles with the circumference of the bristles less than the circumference of the plastic lip.

5. A baster comprising:

a thermo resistant pump having a first end and second open end, wherein the first end is flat;

a tube having a first open end and a second open end with the first open end affixed to the pump, the tube having a top surface and a bottom surface; and a collar fitted to the tube, the collar having a first end and second end with an opening between the two ends sufficient for the collar to slide on the top surface and bottom surface of the tube between the first end and second end of tube, wherein the first end of the collar is shaped as a hook and the second end possesses a means for attaching additional structures or accessories.

6. The baster of claim 5 wherein the pump is composed of a thermo plastic rubber.

7. The baster of claim 5 wherein the pump is composed of silicon.

8. The baster of claim 5 wherein the pump composed of Santoprene®.

9. The baster of claim 5 wherein the tube is syringe shaped.

10. The baster of claim 5 wherein the top surface and/or bottom surface of the tube possesses bumps or other means for limiting the range of motion of an adjustable collar.

11. The baster of claim 5 wherein the tube is acrylic, stainless steel, plastic polymers, heat resistant plastic, polyvinyl chloride, or any other rigid material.

12. A baster comprising:

a thermo resistant pump having a first end and second open end, wherein the first end is flat;

a tube having a first open end and a second open end with the first open end affixed to the pump, the tube having a top surface and a bottom surface; and a collar fitted to the tube, the collar having a first end and second end with an opening between the two ends sufficient for the collar to slide on the top surface and bottom surface of the tube between the first end and second end of tube, wherein the second end of the collar is fitted with a plastic and nylon brush.

13. The baster of claim 12 wherein the plastic and nylon brush is a housing or sheath for a hollow needle assembly that resides within the brush.

14. The brush of claim 12 wherein bristles of the brush reside in a concave structure on the brush such that the plastic lip of the brush structure resides above that of the attachment point for the bristles with the circumference of the bristles less than the circumference of the plastic lip.

15. A baster comprising:

a thermo plastic rubber pump having a first end and second open end, wherein the first end is flat;

a tube having a first open end and a second open end with the first open end affixed to the pump, the tube having a top surface and a bottom surface; and a collar surrounding the tube, the collar having a first end and second end with an opening between the two ends sufficient for the collar to slide on the top surface and bottom surface of the tube between the first end and second end of tube, wherein the first end of the collar is shaped as a hook and the second end possesses a means for attaching additional structures or accessories.

16. The baster of claim 15 wherein the tube is syringe shaped.

17. The baster of claim 15 wherein the top surface and/or bottom surface of the tube possesses bumps or other means for limiting the range of motion of an adjustable collar.

18. The baster of claim 15 wherein the tube is acrylic, stainless steel, plastic polymers, heat resistant plastic, polyvinyl chloride, or any other rigid material.

19. A baster comprising:

a thermo plastic rubber pump having a first end and second open end, wherein the first end is flat;

a tube having a first open end and a second open end with the first open end affixed to the pump, the tube having a top surface and a bottom surface; and a collar surrounding the tube, the collar having a first end and second end with an opening between the two ends sufficient for the collar to slide on the top surface and bottom surface of the tube between the first end and second end of tube, wherein the second end of the collar is fitted with a plastic and nylon brush.

20. The baster of claim 19 wherein the plastic and nylon brush is a housing or sheath for a hollow needle assembly that resides within the brush.

21. The brush of claim 19 wherein bristles of the brush reside in a concave structure on the brush such that the plastic lip of the brush structure resides above that of the attachment point for the bristles with the circumference of the bristles less than the circumference of the plastic lip.

22. A baster comprising:

a silicon pump having a first end and second open end, wherein the first end is flat;

a tube having a first open end and a second open end with the first open end affixed to the pump, the tube having a top surface and a bottom surface; and a collar surrounding the tube, the collar having a first end and second end with an opening between the two ends sufficient for the collar to slide on the top surface and bottom surface of the tube between the first end and second end of tube, wherein the first end of the collar is shaped as a hook and the second end possesses a means for attaching additional structures or accessories.

23. The baster of claim 22 wherein the tube is syringe shaped.

24. The baster of claim 22 wherein the top surface and/or bottom surface of the tube possesses bumps or other means for limiting the range of motion of an adjustable collar.

25. The baster of claim 22 wherein the tube of acrylic, stainless steel, plastic polymers, heat resistant plastic, polyvinyl chloride, or any other rigid material.

26. A baster comprising:
   a silicon pump having a first end and second open end, wherein the first end is flat;
   a tube having a first open end and a second open end with the first open end affixed to the pump, the tube having a top surface and a bottom surface; and
   a collar surrounding the tube, the collar having a first end and second end with an opening between the two ends sufficient for the collar to slide on the top surface and bottom surface of the tube between the first end and second end of tube,
   wherein the second end of the collar is fitted with a plastic and nylon brush.

27. The baster of claim 26 wherein the plastic and nylon brush is a housing or sheath for a hollow needle assembly that resides within the brush.

28. The brush of claim 26 wherein bristles of the brush reside in a concave structure on the brush such that the plastic lip of the brush structure resides above that of the attachment point for the bristles with the circumference of the bristles less than the circumference of the plastic lip.

29. A baster comprising:
   a Santoprene® pump having a first end and second open end, wherein the first end is flat;
   a tube having a first open end and a second open end with the first open end affixed to the pump, the tube having a top surface and a bottom surface; and
   a collar surrounding the tube, the collar having a first end and second with an opening between the two ends sufficient for the collar to slide on the top surface and bottom surface of the tube between the first end and second end of tube,
   wherein the second end of the collar is fitted with a plate and nylon brush.

30. The baster of claim 29 wherein the tube is syringe shaped.

31. The baster of claim 29 wherein the top surface and/or bottom surface of the tube possesses bumps or other means for limiting the range of motion of an adjustable collar.

32. The baster of claim 29 wherein the tube is acrylic, stainless steel, plastic polymers, heat resistant plastic, polyvinyl chloride, or any other rigid material.

33. The baster of claim 29 wherein the plastic and nylon brush is a housing or sheath for a hollow needle assembly that resides within the brush.

34. The brush of claim 29 wherein bristles of the brush reside in a concave structure on the brush such that the plastic lip of the brush structure resides above that of the attachment point for the bristles with the circumference of the bristles less than the circumference of the plastic lip.

35. A baster comprising:
   a Santoprene® pump having a first end and second open end, wherein the first end is flat;
   a tube having a first open end and a second open end with the first open end affixed to the pump, the tube having a top surface and a bottom surface; and
   a collar surrounding the tube, the collar having a first end and second end with an opening between the two ends sufficient for the collar to slide on the top surface and bottom surface of the tube between the first end and second end of tube,
   wherein the first end of the collar is shaped as a hook and the second end possesses a means for attaching additional structures or accessories.

* * * * *